United States Patent
Hatahori et al.

(10) Patent No.: US 11,193,887 B2
(45) Date of Patent: Dec. 7, 2021

(54) DEFECT DETECTION METHOD AND DEVICE

(71) Applicant: Shimadzu Corporation, Kyoto (JP)

(72) Inventors: Takahide Hatahori, Kyoto (JP); Kenji Takubo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/042,010

(22) PCT Filed: Dec. 13, 2018

(86) PCT No.: PCT/JP2018/045903
§ 371 (c)(1),
(2) Date: Sep. 25, 2020

(87) PCT Pub. No.: WO2019/239618
PCT Pub. Date: Dec. 19, 2019

(65) Prior Publication Data
US 2021/0164897 A1    Jun. 3, 2021

(30) Foreign Application Priority Data

Jun. 11, 2018  (JP) .............................. JP2018-110893

(51) Int. Cl.
*G01B 9/02* (2006.01)
*G01N 21/45* (2006.01)
*G01N 21/88* (2006.01)

(52) U.S. Cl.
CPC ............. *G01N 21/45* (2013.01); *G01N 21/88* (2013.01); *G01N 2201/06113* (2013.01)

(58) Field of Classification Search
CPC ..... G01B 9/02; G01J 11/00; G01J 9/02; G01J 9/0246; G01N 21/45

(Continued)

(56) References Cited

U.S. PATENT DOCUMENTS

| 6,295,131 B1* | 9/2001 | Yamaba ............. G01B 9/02019 |
| | | 356/493 |
| 2003/0160969 A1* | 8/2003 | Endo .................. G01B 11/2441 |
| | | 356/520 |

(Continued)

FOREIGN PATENT DOCUMENTS

| JP | 2017-219318 A | 2/2017 |
| WO | 2017/221324 A1 | 12/2017 |

OTHER PUBLICATIONS

Extended European Search Report dated Jun. 23, 2021 for the corresponding European Patent Application No. 18922552.7.

(Continued)

*Primary Examiner* — Md M Rahman
(74) *Attorney, Agent, or Firm* — Muir Patent Law, PLLC

(57) ABSTRACT

A defect detection device 10 is provided with: a laser light source 11 for irradiating laser light to a measurement region R of a surface of an inspection object S; a laser light source control unit 15 for controlling the laser light source so as to cause laser light to be outputted continuously or quasi-continuously for a time longer than a period of vibration generated in the inspection object; an interferometer (speckle shearing interferometer 14) for generating interference light in which reflected light of the laser light reflected in the measurement region and reference laser light emitted from the laser light source 11 interfere; a detector (image sensor 145) for detecting the intensity of the interference light for each point in the measurement region R; a phase shifter 143 for shifting the phase of the reflected laser light or the reference laser light; an integrated intensity pattern determination unit 16 for obtaining an integrated intensity obtained by integrating the intensity for each point over an integration time longer the period of the vibration in three or more phases, the phase being shifted by the phase shifter 143 into three or more different phases; an interference degree (Continued)

distribution generation unit 17 for obtaining the distribution of the degree of interference based on the integrated intensity obtained in each of the three or more phases for each point; and a defect detection unit 18 for detecting a defect in the measurement region R based on the distribution of the degree of interference in the measurement region R.

11 Claims, 4 Drawing Sheets

(58) Field of Classification Search
USPC .......................................................... 356/450
See application file for complete search history.

(56) References Cited

U.S. PATENT DOCUMENTS

| 2003/0179382 | A1 | 9/2003 | Petersen et al. |
| 2017/0350690 | A1 | 12/2017 | Hatahori et al. |
| 2019/0204275 | A1 | 7/2019 | Hatahori et al. |

OTHER PUBLICATIONS

Nakajima, "Vibration Analysis by Holography", pp. 560-573, Apr. 25, 1972, submitted with a machine translation.
Written Opinion of the International Searching Authority (ISA237) for PCT application PCT/JP2018/045903, dated Jan. 29, 2019, submitted with a machine translation.

\* cited by examiner

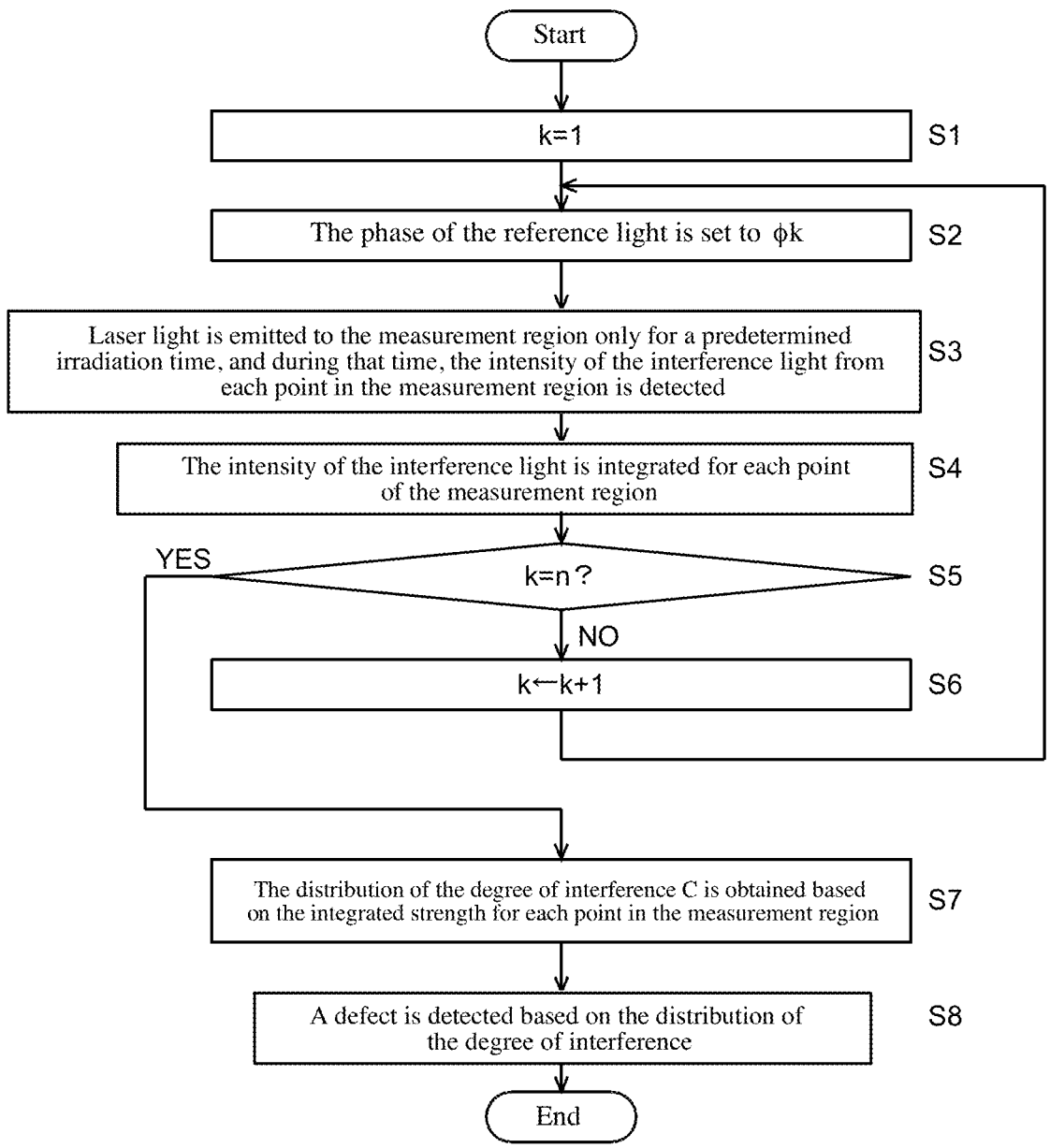

Surface of the inspection object S imaged with a camera

Distribution of the degree of interference

DEFECT DETECTION METHOD AND DEVICE

TECHNICAL FIELD

The present invention relates to a defect detection method and a defect detection device for detecting a defect of an inspection object, such as, e.g., a concrete structure and a steel structure.

BACKGROUND ART

As a method for detecting a defect on a surface or an inside of an inspection object, a defect detection method using speckle interferometry or speckle shearing interferometry has been proposed. The speckle interferometry is configured such that laser light from a laser light source is branched into irradiation light and reference light, the irradiation light is emitted to the measurement region, and an interference pattern due to the light of the irradiation light reflected at each point on the surface of the inspection object in the measurement region and the reference light is acquired. The speckle shearing interferometry is configured such that a measurement region is illuminated using laser light from a laser light source (no branching of reference light is performed) and an interference pattern due to the light reflected from two adjacent points on a surface of an inspection object in a measurement region is acquired. In the speckle shearing interferometry, the light reflected from a point close to each point on the surface of the inspection object in the measurement region corresponds to the reference light. In these defect detection methods, an elastic wave is inputted to an inspection object from an excitation source, and images of interference patterns are taken by a CCD camera, etc., before and after the input, respectively, and the distribution of the displacement in the measurement region in the front-rear direction (out-of-plane direction) is calculated from these two images. Since the displacements are discontinuous at a defect position, a defect present in the measurement region can be detected.

However, if only one image of an interference pattern after inputting an elastic wave is acquired, only one state of the elastic wave is seen, so when the wavelength of the elastic wave is smaller than the measurement region, although the detection can be easily made if the defect happens to exist in a portion where the amplitude of the wave is large, it becomes difficult to the detect when the defect exists in a portion where the amplitude is small. That is, differences in the defect inspection capability will occur depending on a location in the measurement region. On the other hand, the defect detection method described in Patent Document 1 performs strobe illumination by a pulsed laser light source in at least three phases of a continuous wave (vibration) differing from each other while exciting the continuous wave of the elastic wave to the inspection object to capture the image of the interference pattern, and obtains the displacement of each point based on the interference patterns and the phase of the vibration when each interference pattern is acquired. With this, regardless of the relationship between the size of the measurement region and the wavelength of the elastic wave, the total vibration state of the elastic wave can be reproduced at any location in the measurement region, so that a defect can be detected with high accuracy without depending on the location in the measurement region.

PRIOR ART DOCUMENT

Patent Document

Patent Document 1: Japanese Unexamined Patent Application Publication No. 2017-219318

SUMMARY OF THE INVENTION

Problems to be Solved by the Invention

In a defect detection method using speckle interferometry or speckle shearing interferometry including the method described in Patent Document 1, the excitation device excites vibration to an inspection object, but it is difficult to attach the excitation device to an inspection object if the inspection object is located in a hard-to-access place for people, such as, e.g., a high place and above water. Further, even if the attachment could be made, the cost increases due to the excitation device itself and the equipment, etc., for communication between the excitation device and a measuring device.

An object sought to be solved by the present invention is to provide a defect detection method and a defect detection device capable of detecting a defect of an inspection object without using an excitation device or without requiring communication between the excitation device and a measuring device.

Means for Solving the Problem

A defect detection method according to the present invention made to solve the above-described problems, includes:

emitting laser light continuously or quasi-continuously from a laser light source for a time longer than a period of vibration generated in an inspection object to a measurement region on a surface of the inspection object in a state in which the vibration is being generated in the inspection object;

generating integrated intensity for each point in the measurement region three or more times by shifting a phase of either reflected laser of the laser light reflected in the measurement region or reference laser light emitted from the laser light source, the integrated intensity being obtained by integrating intensity of interference light in which the reflected laser light and the reference laser light interfere over an integration time longer than the period of the vibration; and obtaining a distribution of a degree of interference from respective integrated intensities obtained in three or more phases for each point and detecting a defect in the measurement region based on the distribution of the degree of interference.

The defect detection method according to the present invention is performed in a state in which the inspection object is being vibrated. However, there is no need to use an excitation device to generate vibration, and it is possible to use environmental vibration, which is vibration generated in the inspection object under circumstances in which the inspection object is used. As an example of the environmental vibration, in cases where a bridge on which vehicles run is an inspection object, vibration generated by traffic loads due to traveling of vehicles, etc., can be exemplified. Such environmental vibration is usually irregular vibration, but the present invention can be implemented in a state in which such irregular vibration is being generated in the inspection object. Of course, an excitation means may be used to generate vibration in the inspection object. As such an excitation means, for example, a vibrating vehicle for giving artificial vibration to a road surface, or an electric tool such as an electric hammer when the inspection object is relatively small can be used. Alternatively, vibration may be applied to an inspection object by a user by striking with a manual (non-electric) tool (excitation means) such as a hammer. Note that regular vibration may be given to an inspection object by using an ultrasonic vibrator, etc.

In a state in which vibration is being generated in an inspection object as described above, laser light emitted from a laser light source is continuously or quasi-continuously emitted to a measurement region which is a target region of a defect detection on a surface of an inspection object for a time longer than a period of the vibration generated in the inspection object. Here, the laser light emitted "quasi-continuously" refers to laser light emitted intermittently at a period and a phase independent of the period and the phase of the vibration of the inspection object. Then, the integrated intensity of the interference light in which the reflected laser light reflected in the measurement region and the reference laser light emitted from the same laser light source interferes is obtained for each point in the measurement region.

Note that, the integrated intensity may be obtained by integrating a plurality of values obtained by measuring the intensity of the interference light a plurality of times by calculation, or may be obtained by continuously measuring the intensity of the interference light with a detector for a time longer than the period of the vibration. In the case of detecting the intensity of the interference light for each point in the measurement region with an image sensor, the period of the vibration is usually shorter than an exposure time of an image sensor, so the integrated intensity can be obtained using the latter method.

As the method for obtaining the interference light of the reflected laser light and the reference laser light, speckle interferometry or speckle shearing interferometry can be used. In the speckle interferometry, a part of laser light emitted from a laser light source and branched just before the measurement region is used as reference laser light. In the speckle shearing interferometry, for reflected laser light reflected at each position in the measurement region, laser light which is laser light emitted from the laser light source and reflected in the vicinity of the position is used as reference laser light.

The above-described integrated intensity is generated three or more times by shifting the phase of either the reflected laser light or the reference laser light. Here, the shift of the phase may be performed by shifting the phase of only one of the reflected laser light and the reference laser light, or may be performed by shifting the phase of both the reflected laser light and the reference laser light so that the mutual phases differ. The shift amount of the phase may be arbitrarily determined, but the interval of three or more phases is preferably close to an equal interval.

The integrated intensity for each phase obtained as described above has the following meanings. In cases where the reflected laser light and the reference laser light have complete coherence and the optical path difference between the reflected laser light and the reference laser light does not change within the integration time, the integrated intensity I of the reference laser light is represented as follows by using the integrated intensity $I_1$ of the reflected laser light, the integrated intensity $I_2$ of the reference laser light, and the phase difference $\varphi$ between the reflected laser light and the reference laser light, $$I=(I_1+I_2)+2(I_1 \times I_2)^{1/2} \cos \varphi$$
$$=A+B \cos \varphi \quad (1)$$
$$(A=I_1+I_2, B=2(I_1 \times I_2)^{1/2})$$

Where A is the intensity of the background light independent of the phase difference $\varphi$, and B is the amplitude of the interference light. The value $B/A=C$ obtained by dividing the amplitude B of the interference light by the intensity A of the background light is referred to and defined as a degree of interference in this specification.

As the position where the reflected laser light is reflected by the vibration of the inspection object changes, the optical path difference between the reflected laser light and the reference laser light changes accordingly. When the fluctuation of this optical path difference occurs within the integration time, the degree of interference is reduced. Further, the larger the amplitude of the vibration of the inspection object, the greater the change in the optical path difference, which increases the deterioration of the degree of interference. Since the amplitude of the vibration differs depending on the presence or absence of a defect in the inspection object, the value of the degree of interference C for each point in the measurement region also differs depending on the presence or absence of a defect at that position. Then, since the intensity I in Equation (1) is determined by the three parameters A, B, $\varphi$, by obtaining the intensity at at least three phases, it is possible to obtain the value of this degree of interference C(=B/A).

Therefore, the distribution of a defect can be obtained by obtaining the distribution of the degree of interference C based on the integrated intensity for each point in the measurement region in at least three phases, so that a defect in the measurement region can be detected.

A defect detection device according to the present invention includes:

a laser light source configured to emit laser light to a measurement region on a surface of an inspection object;

a laser light source control unit configured to control the laser light source so as to cause the laser light to be outputted continuously or quasi-continuously for a time longer than a period of vibration generated in the inspection object;

an interferometer configured to generate interference light in which reflected laser light reflected in the measurement region and reference laser light emitted from the laser light source interfere;

a detector configured to detect intensity of the interference light for each point in the measurement region;

a phase shifter configured to shift a phase of either the reflected laser light or the reference laser light;

an integrated intensity determination unit configured to make the phase shifter shift the phase into three or more different phases and obtain integrated intensity obtained by integrating the intensity of the interference light for each point over an integration time longer than a period of the vibration in the three or more phases;

an interference degree distribution generation unit configured to obtain a distribution of a degree of interference based on the integrated intensity obtained in each of the three or more phases for each point; and a defect detection unit configured to detect a defect in the measurement region based on the distribution of the degree of interference in the measurement region.

In the defect detection device, in place of the defect detection unit or together with the defect detection unit, a display unit for displaying information based on the distribution of the degree of interference in the measurement region may be provided. In this case, the user will find a defect by visually observing the information based on the distribution of the degree of interference displayed on the display unit.

Effects of the Invention

According to the defect detection method and the defect detection device of the present invention, it is possible to detect a defect of an inspection object without using an excitation device or without requiring communication between an excitation device and a measurement device.

BRIEF DESCRIPTION OF THE DRAWINGS

FIG. 3 is a flowchart showing a defect detection method of this embodiment.

EMBODIMENTS FOR CARRYING OUT THE INVENTION

Embodiments of a defect detection method and a defect detection device according to the present invention will be described with reference to FIG. 1 to FIG. 5.

(1) Configuration of Defect Detection Device of this Embodiment

Figure 1:
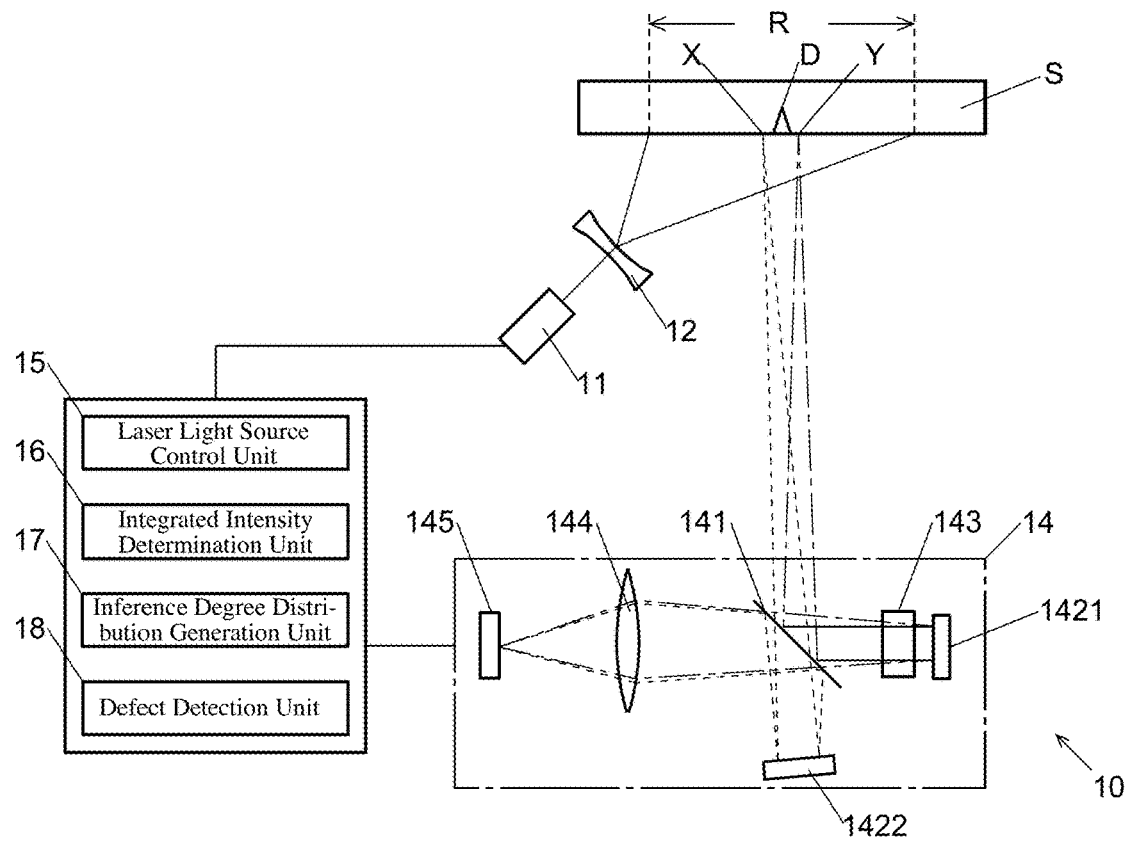
FIG. 1 is a schematic configuration diagram showing an embodiment of a defect detection device according to the present invention.

FIG. 1 is a schematic configuration diagram of a defect detection device 10 of this embodiment. The defect detection device 10 is provided with a laser light source 11, an irradiation light lens 12, a speckle shearing interferometer 14, a laser light source control unit 15, an integrated intensity determination unit 16, an interference degree distribution generation unit 17, and a defect detection unit 18.

The laser light source 11 is a light source for outputting laser light and is configured to emit the laser light to the inspection object S. The irradiation light lens 12 is a concave lens arranged between the laser light source 11 and the inspection object S, and has the role of spreading the laser light to the entire measurement region R on the surface of the inspection object S.

The speckle shearing interferometer 14 is provided with a beam splitter 141, a first reflecting mirror 1421, a second reflecting mirror 1422, a phase shifter 143, a condenser lens 144, and an image sensor 145.

The beam splitter 141 is a half mirror arranged at a position where the irradiation light reflected at the measurement region R on the surface of the inspection object S is incident. The first reflecting mirror 1421 is arranged on the optical path of the irradiation light reflected by the beam splitter 141, and the second reflecting mirror 1422 is arranged on the optical path of the irradiation light transmitted through the beam splitter 141. The phase shifter 143 is arranged between the beam splitter 141 and the first reflecting mirror 1421 to change (shift) the phase of the light passing through the phase shifter 143. The image sensor 145 is arranged on the optical path of the irradiation light reflected by the first reflecting mirror 1421 after being reflected by the beam splitter 141 and transmitted through the beam splitter 141 and the irradiation light reflected by the second reflecting mirror 1422 and reflected by the beam splitter 141 after being transmitted through the beam splitter 141. The condenser lens 144 is arranged between the beam splitter 141 and the image sensor 145. Here, although the phase shifter 143 is arranged to shift the phase of the laser light reflected by the first reflecting mirror 1421, the phase shifter 143 may be arranged to shift the phase of the laser light reflected by the second reflecting mirror 1422. Alternatively, the phase shifter may be arranged for both the two light to shift both the phases so as to change the phase difference therebetween.

The first reflecting mirror 1421 is arranged so that its reflective surface is at an angle of 45° with respect to the reflective surface of the beam splitter 141. In contrast, the second reflecting mirror 1422 is arranged such that its reflective surface is at an angle slightly inclined from 45° with respect to the reflective surface of the beam splitter 141. The image sensor 145 has a number of detection elements and detects the light incident on the image sensor 145 through the first reflecting mirror 1421 and the phase shifter 143 from a number of points on the surface of the inspection object S by respective different detection elements.

With the above-described arrangement of the first reflecting mirror 1421 and the second reflecting mirror 1422, in the image sensor 145, the irradiation light (see the dashed-dotted line in FIG. 1, which is referred to as the above-described reflected laser light) reflected by a certain point (see the point Y in FIG. 1) on the surface of the inspection object S and the first reflecting mirror 1421 and the irradiation light (see the dashed line in FIG. 1, which is referred to as the above-described reference laser light) reflected by a point (see the point X in FIG. 1) located at a position slightly offset from the point on the surface and the second reflecting mirror 1422 are incident on the same position of the image sensor 145 and interfere.

The laser light source control unit 15 controls the laser light source 11 so as to cause the laser light to be outputted (to be emitted to the measurement region R) continuously for a time (this time will be referred to as "irradiation time") longer than the period of the vibration generated in the inspection object S during the operation of the defect detection. Instead of continuously outputting the laser light, the laser light may be emitted quasi-continuously, i.e., emitted intermittently at a period and a phase independent of the period and the phase of the vibration of the inspection object S.

The integrated intensity determination unit 16 shifts the phase of the reference light into three or more phases by the phase shifter 143 and obtain the integrated intensity by integrating the intensity detected by the detection element at the respective three or more phases, during the irradiation time, for each of the detecting elements, i.e. for each point on the surface of the inspection object S.

The interference degree distribution generation unit 17 obtains the distribution of the degree of interference on the surface of the inspection object S by obtaining the degree of interference for each point on the surface of the inspection object S based on the integrated intensity obtained for each of the three or more phases by the integrated intensity determination unit 16, as will be described later.

The defect detection unit 18 detects a defect D (see FIG. 1) in the measurement region R based on the distribution of the degree of interference in the measurement region R generated by the interference degree distribution generation unit 17.

The laser light source control unit 15, the integrated intensity determination unit 16, the interference degree distribution generation unit 17, and the defect detection unit 18 are embodied by hardware, such as, e.g., a central processing unit (CPU), and software.

The conventional defect detection device described in Patent Document 1 is provided with a vibration source (excitation device) for applying vibration to the inspection object by coming into contact with the inspection object. On the other hand, the defect detection device 10 of this embodiment is not provided with such an excitation device and detects a defect by utilizing environmental vibration generated due to traveling of an automobile or the like in cases where, for example, the inspection object is a bridge. In cases where the inspection target range is relatively small, the user may apply vibration by striking the inspection object with a manual hammer.

Figure 2:
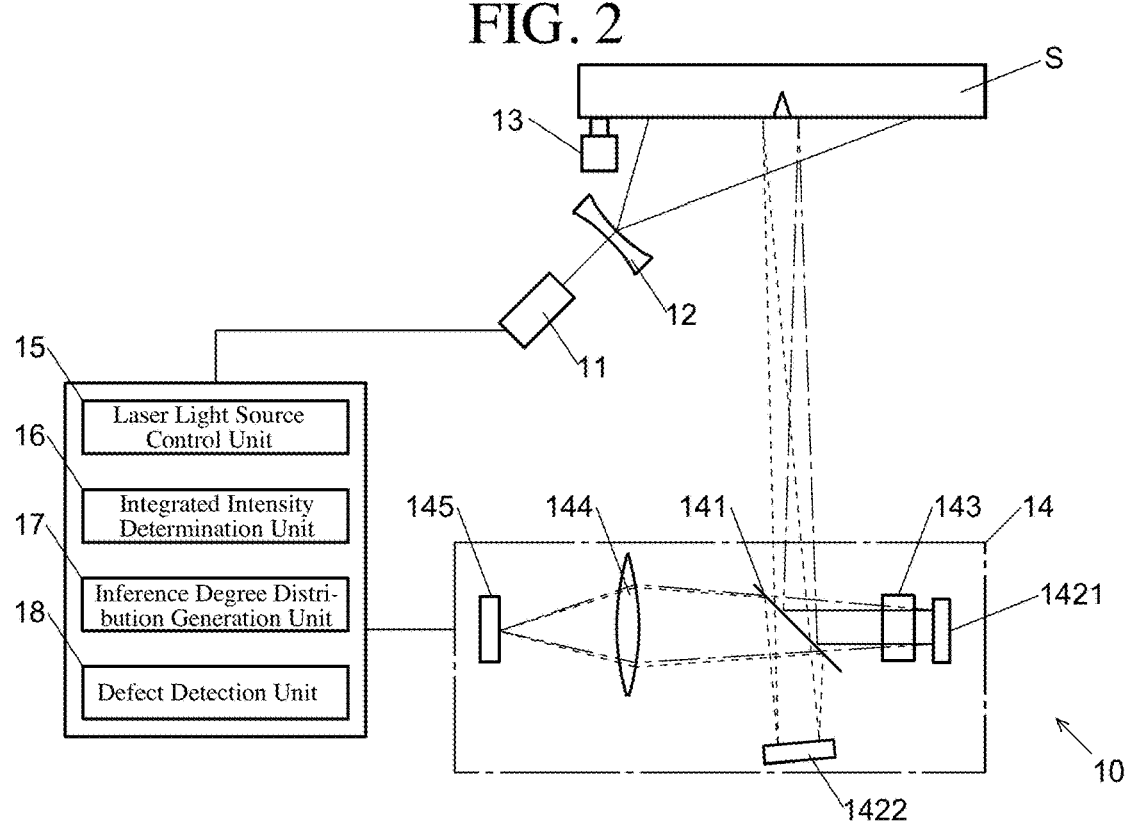
FIG. 2 is a schematic configuration diagram showing a defect detection device according to a modification.

However, as shown in FIG. 2, a vibration source 13 may be added to the defect detection device 10. The vibration source 13 provides vibration to the inspection object, but its vibration need not be periodic. As such a vibration source 13, for example, in cases where the inspection object is a bridge, a vibrating vehicle can be used. Alternatively, in cases where the inspection target range is relatively small, an electric hammer may be used as the vibration source 13.

(2) Operation of Defect Detection Device of this Embodiment and Defect Detection Method of this Embodiment Next, referring to FIG. 3, the operation of the defect detection device 10 of this embodiment and the defect detection method of this embodiment will be described. The defect detection is performed in a state in which environmental vibration generated under environments in which the inspection object S is used is being generated or in a state in which vibration is being applied by the vibration source 13 or the like. In this state, when the phase φ of the reference light is n pieces of $\varphi_1$ to $\varphi_n$ (where n is a natural number equal to or greater than 3), the operation of Steps S2 to S5 is executed as follows. Prior to this, in Step S1, the default value of the value k is set to 1. This value k takes a natural number from 1 to n.

In Step S2, the integrated intensity determination unit 16 sets the phase shifter 143 so that the phase φ of the reference light becomes $\varphi_k$. Subsequently, in Step S3, the laser light source control unit 15 emits laser light from the laser light source 11 to the measurement region R on the surface of the inspection object S through the irradiation light lens 12 during the irradiation time. During this time, each of a number of detecting elements of the image sensor 145 continuously detects the intensity of the interference laser light in which the reflected laser light reflected by a certain point (see the point Y in FIG. 1) of the measurement region R and the first reflecting mirror 1421 and the reference light reflected by a point (see point X in FIG. 1) slightly offset from the above-described point and the second reflecting mirror 1422 interfere.

Next, in Step S4, the integrated intensity determination unit 16 obtains the value of the integrated intensity value for each point by integrating the intensity detected during the irradiation time for each detection element, i.e. for each point on the surface of the inspection object S.

After the end of Step S4, it is determined in Step S5 whether or not k=n. If k=n, the process proceeds to Step S7, which will be described later. On the other hand, if k=n is not satisfied (if k is smaller than n), 1 is added to k in Step S6, and the process returns to Step S2, and the operations of Steps S2 to S5 are repeatedly performed until k=n is satisfied.

In Step S7, the interference degree distribution generation unit 17 obtains the distribution of the value of the degree of interference C based on the value of the integrated intensity for each point in the measurement region R generated by the integrated intensity determination unit 16. By the operation up to this point, since the integrated intensity is obtained for n phases, i.e., three or more phases, the degree of interference C can be obtained as described above.

For example, when the phase of the reference laser light is changed from the initial $\varphi_0$ by 0 (no-shift), +π/2, +π, and +3π/2, the degree of interference C can be obtained as follows. When the shift amount is 0, +π/2, +π, +3π/2, the intensity $I_1$, $I_2$, $I_3$, and $I_4$ is as shown in Equation (1).

$$I_1 = A + B \cos \varphi_0$$
$$I_2 = A + B \cos(\varphi_0 + \pi/2)$$
$$I_3 = A + B \cos(\varphi_0 + \pi)$$
$$I_4 = A + B \cos(\varphi_0 + 3\pi/2)$$

From these $I_1$ to $I_4$, A and B are shown as follows.

$$A = \frac{I_1 + I_2 + I_3 + I_4}{4}$$
$$B = \frac{1}{2}\sqrt{(I_4 - I_2)^2 + (I_1 - I_3)^2}$$

The degree of interference C=B/A is shown as follows.

$$C = \frac{2\sqrt{(I_4 - I_2)^2 + (I_1 - I_3)^2}}{I_1 + I_2 + I_3 + I_4}$$

Note that, although the case in which the shift amount by the phase shifter 143 is 0, +π/2, +π, and +3π/2 has been described here, the shift amount may be four which is different from the above. Further note that even if the number of the shift amount (value of n) is three or five or more, the degree of interference C can be obtained in the same manner. The value of n is preferably larger to obtain the degree of interference C more accurately, but if the value of n is too large, the number of operations to acquire the integrated intensity (the number of times to repeat Step S2 to S5) is increased, which takes time. Therefore, it is sufficient to determine the value of n in consideration of the accuracy and time.

The degree of interference C obtained as described above reflects the difference in the amplitude at each point according to the vibration of the inspection object S. Taking advantage of the fact that such difference of the amplitude depends on the presence or absence of a defect at each point, the defect detection unit 18 determines the location of the defect in the measurement region R (Step S8) from the distribution of the degree of interference C obtained based on the distribution of each point in the integrated intensity. This completes a series of operations by the defect detection device 10 and the defect detection method of this embodiment.

Figure 4A:
FIG. 4A is a view showing an example in which a defect of an inspection object is detected using a defect detection device of this embodiment, and is an image captured by imaging a surface of an inspection object with a normal camera.
Figure 4B:
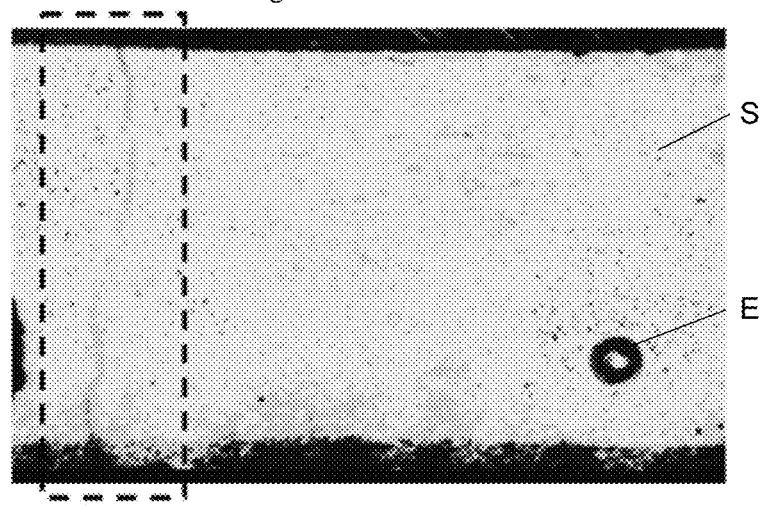
FIG. 4B is a view showing an example in which a defect of an inspection object is detected using a defect detection device of this embodiment, and is an image showing a distribution of a degree of interference.

FIG. 4A and FIG. 4B show an example in which a defect of an inspection object S was detected using the defect detection device 10 and the defect detection method of this embodiment. FIG. 4A shows an image obtained by imaging the surface of the inspection object S with a normal camera. A coin E is placed on the surface of the inspection object S. By obtaining the integrated intensity of the interference light while changing the phase of the reference laser light by the four shift amounts by applying non-periodic vibration to the inspection object S with an electric hammer, the distribution of the degree of interference C was obtained. FIG. 4B shows the distribution of the degree of interference C. At the position where the coin E is placed, vibration different from vibration at the other position on the surface of the inspection object S is generated, and therefore the coin E is displayed in a shade different from the periphery of the coin E. Then, in the region surrounded by the broken line in FIG. 4B, a line that extends in a curved manner in the up-down direction of the figure and is darker than the periphery is reflected. This line indicates that there exists a crack (defect) in the inspection object S. This crack cannot be seen visually or in the image of a conventional camera shown in FIG. 4A, and it was detected for the first time by the defect detection device 10 and the defect detection method of this embodiment.

According to the defect detection device 10 and the defect detection method of this embodiment, a defect of the inspection object S can be detected without using an excitation device. Therefore, even in cases where the inspection object is located in a hard-to-access place for people, such as, e.g., a high place and above water and therefore it is difficult to attach an excitation device to the inspection object, a defect can be detected and the cost of the device can be reduced. Also, even in the case of using an excitation device, there is no need to generate regular vibration, so that inexpensive devices can be used.

Figure 5:
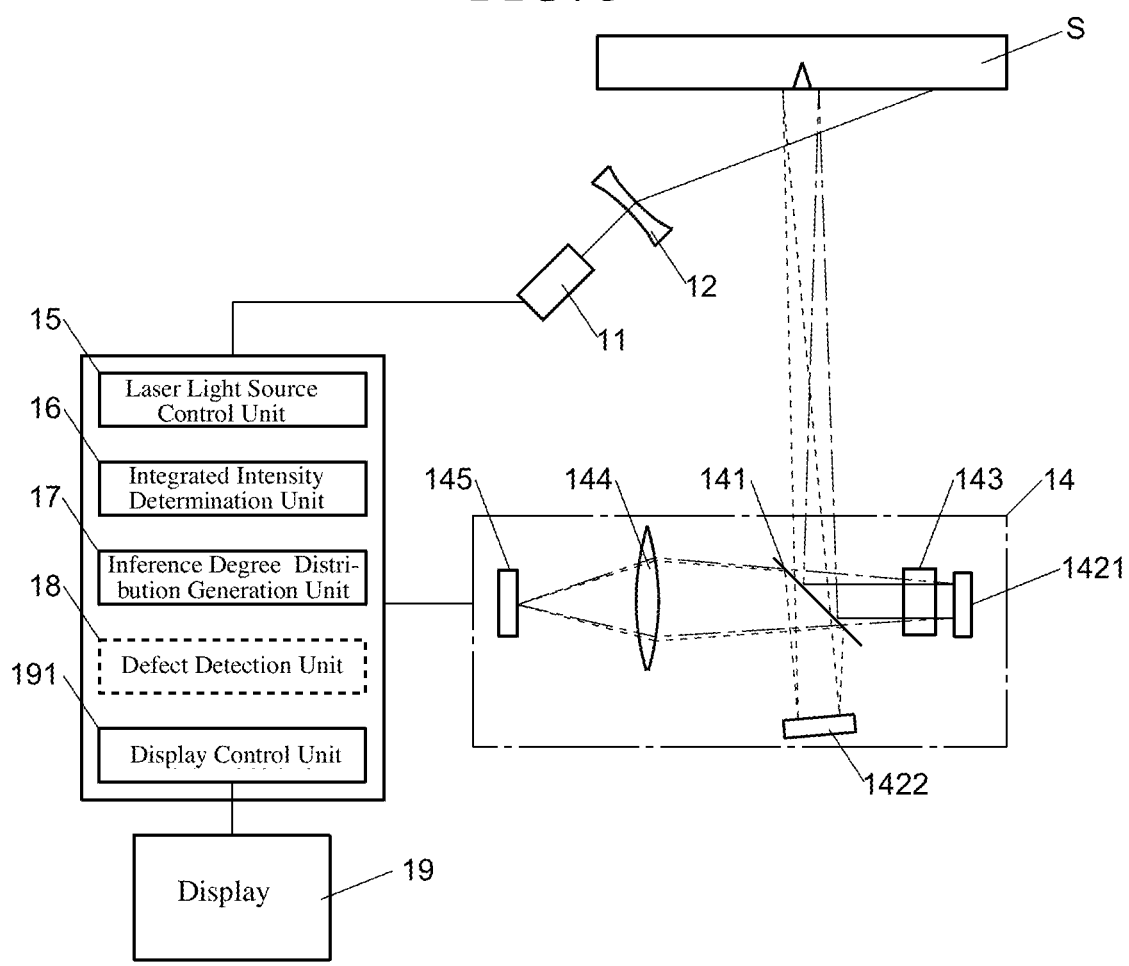
FIG. 5 is a schematic configuration diagram showing a defect detection device according to another modification.

The present invention is not limited to the above-described embodiment. For example, as shown in FIG. 5, instead of the defect detection unit 18 in the defect detection device 10, or together with the defect detection unit 18, there may be provided a display unit (display) 19 for displaying the distribution (see FIG. 4B) of the degree of interference C as information based on the distribution of the integrated intensity in the measurement region R, and a display control unit 191 for controlling the display unit 19 to display the distribution of the degree of interference C. In this case, the user can visually detect a defect based on the distribution of the degree of interference C displayed on the display unit 19.

Further, the speckle shearing interferometer 14 is used in the defect detection device 10 of the above-described embodiment, but speckle interferometer may be used instead. Instead of using the light reflected from a nearby point as reference light, speckle interferometer branches the laser light between the laser light source and the inspection object, one of which is emitted to the inspection object and is reflected by the inspection object is used as reflected laser light, and the other as reference laser light to obtain the interference light thereof. The phase shifter may be provided on either one of or both of the optical paths of the reflected laser light and the reference laser light.

DESCRIPTION OF SYMBOLS

10: Defect detection device
11: Laser light source
12: Illumination light lens
13: Vibration source
14: Speckle shearing interferometer
141: Beam splitter
1421: First reflecting mirror
1422: Second reflecting mirror
143: Phase shifter
144: Condenser lens
145: Image sensor
15: Laser light source control unit
16: Integrated intensity determination unit
17: Interference degree distribution generation unit
18: Defect detection unit
19: Display unit
191: Display control unit
D: Defect
E: Coin placed on an inspection object
R: Measurement region
S: Inspection object
X, Y: Point in a measurement region

The invention claimed is:

1. A defect detection method comprising:
emitting laser light continuously or quasi-continuously from a laser light source for a time longer than a period of vibration generated in an inspection object to a measurement region on a surface of the inspection object in a state in which the vibration is being generated in the inspection object;
generating integrated intensity for a plurality of points in the measurement region three or more times by shifting a phase of either reflected laser of the laser light reflected in the measurement region or reference laser light emitted from the laser light source, the integrated intensity being obtained by integrating intensity of interference light in which the reflected laser light and the reference laser light interfere over an integration time longer than the period of the vibration; and
obtaining a distribution of a degree of interference from respective integrated intensities obtained in three or more phases for each point of the plurality of points in the measurement region and detecting a defect in the measurement region based on the distribution of the degree of interference.

2. The defect detection method as recited in claim 1, wherein the reference laser light is laser light obtained by branching a part of the laser light emitted from the laser light source just before the measurement region.

3. The defect detection method as recited in claim 1, wherein the reference laser light is laser light emitted from the laser light source and reflected in the measurement region.

4. The defect detection method as recited in claim 1, wherein the vibration is environmental vibration generated in the inspection object in an environment in which the inspection object is used.

5. The defect detection method as cited in claim 4, wherein the environmental vibration is generated by a traffic load applied to the inspection object.

6. The defect detection method as recited in claim 1, wherein the vibration is applied to the inspection object by an excitation means.

7. The defect detection method as recited in claim 6, wherein the excitation means is one of a vibrating vehicle, an ultrasonic vibrator, an electric tool, and a non-power tool.

8. A defect detection device comprising:
a laser light source configured to emit laser light to a measurement region on a surface of an inspection object;

a laser light source control unit configured to control the laser light source so as to cause the laser light to be outputted continuously or quasi-continuously for a time longer than a period of vibration generated in the inspection object;

an interferometer configured to generate interference light in which reflected laser light of the laser light reflected in the measurement region and reference laser light emitted from the laser light source interfere;

a detector configured to detect intensity of the interference light for a plurality of points in the measurement region;

a phase shifter configured to shift a phase of either the reflected laser light or the reference laser light;

an integrated intensity determination unit configured to make the phase shifter shift the phase into three or more different phases and obtain integrated intensity obtained by integrating the intensity of the interference light for each point over an integration time longer than a period of the vibration in the three or more phases;

an interference degree distribution generation unit configured to obtain a distribution of a degree of interference based on the integrated intensity obtained in each of the three or more phases for each point of the plurality of points in the measurement region; and a defect detection unit configured to detect a defect in the measurement region based on the distribution of the degree of interference in the measurement region.

9. The defect detection device as recited in claim 8, wherein the reference laser light is laser light obtained by branching a part of the laser light emitted from the laser light source just before the measurement region.

10. The defect detection device as recited in claim 8, wherein the reference laser light is laser light emitted from the laser light source and reflected in the measurement region.

11. The defect detection device as recited in claim 8, wherein a display unit configured to display information based on the distribution of the degree of interference in the measurement region is provided, instead of the defect detection unit or together with the defect detection unit.

* * * * *